United States Patent
Breisinger et al.

(10) Patent No.: US 11,415,983 B2
(45) Date of Patent: Aug. 16, 2022

(54) DRIVING SYSTEM FOR AN AUTOMATED DRIVE WITH MEANS FOR MARKING REGIONS ON THE STEERING WHEEL, AND CORRESPONDING METHOD

(71) Applicant: Bayerische Motoren Werke Aktiengesellschaft, Munich (DE)

(72) Inventors: Marc Breisinger, Munich (DE); Nora Broy, Munich (DE); Julian Eichhorn, Menlo Park, CA (US); Sebastian Hergeth, Munich (DE); Philipp Kerschbaum, Munich (DE); Hermann Kuenzner, Freising (DE); Lutz Lorenz, Deisenhofen (DE); Stephan Mueller, Munich (DE); Julia Niemann, Berlin (DE); Frederik Platten, Munich (DE); Wolfgang Spiessl, Munich (DE); Philipp Suessenguth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 217 days.

(21) Appl. No.: 16/692,136

(22) Filed: Nov. 22, 2019

(65) Prior Publication Data
US 2020/0089226 A1 Mar. 19, 2020

Related U.S. Application Data

(63) Continuation of application No. PCT/EP2018/063345, filed on May 22, 2018.

(30) Foreign Application Priority Data

May 23, 2017 (DE) ...................... 10 2017 208 762.5

(51) Int. Cl.
*G05D 1/00* (2006.01)
*B60K 35/00* (2006.01)
(Continued)

(52) U.S. Cl.
CPC ........... *G05D 1/0061* (2013.01); *B60K 35/00* (2013.01); *B62D 1/06* (2013.01); *G05D 1/0088* (2013.01);
(Continued)

(58) Field of Classification Search
CPC .................................................. G05D 1/0061
See application file for complete search history.

(56) References Cited

U.S. PATENT DOCUMENTS 8,260,482 B1 9/2012 Szybalski et al.
9,874,871 B1 * 1/2018 Zhu ........................ G05D 1/027
(Continued)

FOREIGN PATENT DOCUMENTS

DE 103 52 733 A1 10/2004
DE 10 2007 052 258 A1 6/2008
(Continued)

OTHER PUBLICATIONS

Google patents Machine Translation of German Patent Pub. No.: DE102007052258B4 to Manfred that was filed in 2007.*
(Continued)

*Primary Examiner* — Jean Paul Cass
(74) *Attorney, Agent, or Firm* — Crowell & Moring LLP

(57) ABSTRACT

A driving system for an automated drive for a motor vehicle has an indicator for marking regions on the steering wheel, in particular on the steering wheel rim. The indicator is preferably an optical steering wheel display which is integrated into the steering wheel rim for example. During an automated drive, the driving system is designed to ascertain that the vehicle has approached an end of the automated drive lying ahead in such a manner that a first approach condition has been satisfied. If the system has ascertained that the vehicle has approached the end of the automated drive in such a manner that the approach condition has been
(Continued)

satisfied, the indicator for marking regions on the steering wheel are actuated in response thereto such that a left and a right marking region on the steering wheel are marked. The driver is thus prompted to position their hands on the marked regions of the steering wheel in order to take over the task of driving.

12 Claims, 8 Drawing Sheets

(51) Int. Cl.
    *B62D 1/06* (2006.01)
    *G05D 1/02* (2020.01)
    *B62D 15/02* (2006.01)

(52) U.S. Cl.
    CPC ........ *G05D 1/021* (2013.01); *B60K 2370/175* (2019.05); *B60K 2370/52* (2019.05); *B60K 2370/782* (2019.05); *B62D 15/029* (2013.01)

(56) References Cited

U.S. PATENT DOCUMENTS

| | | | |
|---|---|---|---|
| 9,932,038 B1* | 4/2018 | Zhu | B60W 40/105 |
| 10,246,012 B2 | 4/2019 | Asakawa et al. | |
| 10,780,908 B2* | 9/2020 | Gardner | B62D 1/046 |
| 2006/0070795 A1 | 4/2006 | Meissner | |
| 2014/0081521 A1* | 3/2014 | Frojdh | B60R 16/037 |
| | | | 701/36 |
| 2014/0111325 A1* | 4/2014 | Lisseman | B62D 1/06 |
| | | | 340/435 |
| 2014/0328077 A1 | 11/2014 | Tovar et al. | |
| 2015/0123947 A1* | 5/2015 | Jubner | G06F 3/04842 |
| | | | 345/175 |
| 2016/0185387 A1 | 6/2016 | Kuoch | |
| 2016/0231743 A1 | 8/2016 | Bendewald et al. | |
| 2018/0017968 A1* | 1/2018 | Zhu | B60W 50/082 |
| 2018/0111612 A1* | 4/2018 | Jiang | B62D 15/0255 |
| 2018/0188727 A1* | 7/2018 | Zhuang | B60W 50/035 |
| 2018/0208111 A1* | 7/2018 | Lisseman | B62D 1/06 |
| 2018/0251135 A1* | 9/2018 | Luo | G05D 1/0061 |
| 2018/0299898 A1* | 10/2018 | Luo | B60W 50/082 |
| 2019/0016383 A1* | 1/2019 | Spencer | B60Q 3/283 |
| 2019/0220012 A1* | 7/2019 | Zhang | B60W 50/0225 |
| 2020/0064836 A1* | 2/2020 | Zhang | G05D 1/0278 |
| 2020/0064859 A1* | 2/2020 | Zhang | G05D 1/0231 |
| 2021/0027214 A1* | 1/2021 | Bromwich | G06Q 50/30 |

FOREIGN PATENT DOCUMENTS

| | | | | |
|---|---|---|---|---|
| DE | 102007052258 A1 * | 6/2008 | | B62D 1/286 |
| DE | 10 2011 112 134 A1 | 3/2013 | | |
| DE | 10 2012 221 090 A1 | 5/2013 | | |
| DE | 10 2013 012 779 A1 | 2/2015 | | |
| DE | 10 2013 110 852 A1 | 4/2015 | | |
| DE | 10 2014 118 958 A1 | 6/2016 | | |
| DE | 10 2016 123 786 A1 | 6/2017 | | |
| EP | 3 124 352 A1 | 2/2017 | | |
| WO | WO 2016/014692 A1 | 1/2016 | | |

OTHER PUBLICATIONS

International Search Report (PCT/ISA/210) issued in PCT Application No. PCT/EP2018/063345 dated Aug. 23, 2018 with English translation (six pages).
German-language Written Opinion (PCT/ISA/237) issued in PCT Application No. PCT/EP2018/063345 dated Aug. 23, 2018 (six pages).
German-language Search Report issued in counterpart German Application No. 10 2017 208 762.5 dated Mar. 22, 2018 with partial English translation (13 pages).

* cited by examiner

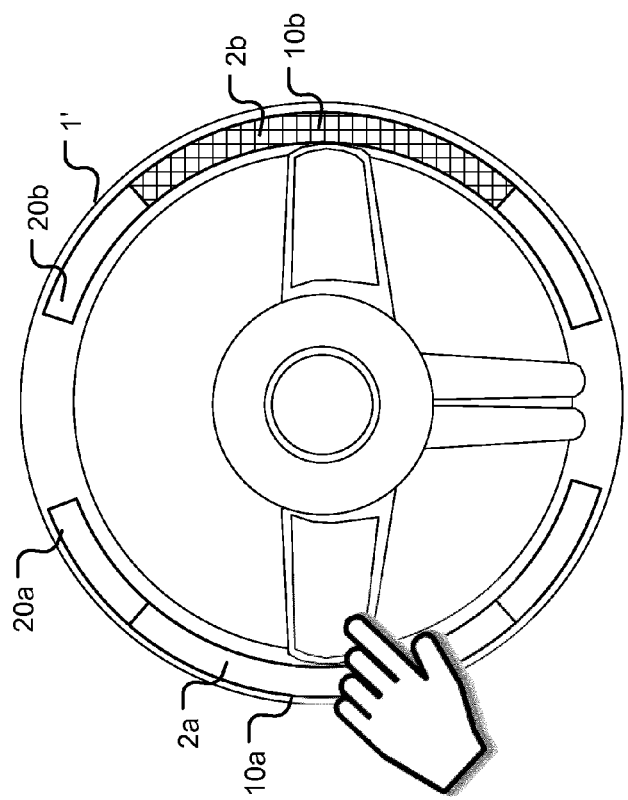

DRIVING SYSTEM FOR AN AUTOMATED DRIVE WITH MEANS FOR MARKING REGIONS ON THE STEERING WHEEL, AND CORRESPONDING METHOD

CROSS REFERENCE TO RELATED APPLICATIONS

This application is a continuation of PCT International Application No. PCT/EP2018/063345, filed May 22, 2018, which claims priority under 35 U.S.C. § 119 from German Patent Application No. 10 2017 208 762.5, filed May 23, 2017, the entire disclosures of which are herein expressly incorporated by reference.

BACKGROUND AND SUMMARY OF THE INVENTION

The invention relates to a driving system for automated driving for a motor vehicle, in particular a passenger vehicle, and to a display method for a driving system for automated driving.

The term "automated driving" can be understood within the context of the document to mean driving with automated longitudinal or transverse guidance or autonomous driving with automated longitudinal and transverse guidance. The automated driving within the context of the application is typically driving for a relatively long time, for example on the freeway. The term "automated driving" covers automated driving with an arbitrary level of automation, in the case of which the driver needs to be capable, before an imminent end of automated driving, of taking over part or all of the driving task.

Exemplary levels of automation are assisted, semiautomated, highly automated or fully automated driving, in particular highly automated and fully automated driving. These levels of automation have been defined by the German Federal Highway Research Institute (BASt) (see BASt publication "Forschung kompakt", issue 11/2012). Assisted driving involves the driver continually performing the longitudinal or transverse guidance while the system undertakes the respective other function within certain boundaries. Semiautomated driving (SAD) involves the system undertaking the longitudinal and transverse guidance for a certain period of time and/or in specific situations, with the driver needing to continually monitor the system as in the case of assisted driving. Highly automated driving (HAD) involves the system undertaking the longitudinal and transverse guidance for a certain period of time without the driver needing to continually monitor the system; however, the driver must be capable of undertaking the vehicle guidance within a certain time. In the case of fully automated driving (FAD), the system can manage the driving automatically in all situations for a specific application; this application no longer requires a driver. The aforementioned four levels of automation correspond to SAE levels 1 to 4 of the SAE (Society of Automotive Engineering) J3016 standard. By way of example, highly automated driving (HAD) corresponds to level 3 of the SAE J3016 standard.

Vehicles that drive in automated fashion generally cannot do so under all road and environmental conditions.

By way of example, for a driving system for highly automated driving on the freeway, there may be provision for the vehicle to be able to drive in highly automated fashion only on road sections of the freeway that are approved for highly automated driving. Before the end of a road section currently being used that is approved for highly automated driving and after which highly automated driving is no longer possible is reached, the driver needs to take over vehicle guidance in general completely, but at least in part. An end of the automation road can also arise on account of current events such as for example an accident, a queue or a person on the freeway. Furthermore, such driving systems for highly automated driving typically require the driver to take over vehicle guidance before leaving the freeway for a different type of road.

As a result of the road for automated driving generally being limited for various reasons, there is the need for vehicle guidance to be handed over from the driving system to the driver in good time before an end of automated driving lying ahead. There are various approaches to asking the driver to take over vehicle guidance, for example visual warnings on a display (e.g. on a screen), audible warnings, haptic warnings by means of haptic signals.

The document DE 10 2011 112 134 A1 discloses a steering wheel whose steering wheel rim has light sources. When the autonomous driving mode of the vehicle is activated, the light sources of the steering wheel rim are activated.

Further, the document DE 10 2013 012 779 A1 describes the use of an arcuate light emitting unit in the steering wheel rim for visually signaling the activation of an automatic driving mode and for visually signaling a take over request. Following activation of the autonomous driving mode, the steering wheel rim glows green, for example. When changing to the manual driving mode, the steering wheel rim initially continues to glow green and blinks in the process. If a take over then does not take place, the steering wheel rim glows red. After the driver takes over, the steering wheel rim glows blue.

The document DE 10 2007 052 258 A1 discloses the practice of signaling the state of the transverse guidance by means of a light emitting ring on the steering wheel. When transverse guidance is deactivated, the light-emitting ring glows red. In the standby state, the light-emitting ring glows in a yellow color, for example. When changing from the deactivated state of transverse guidance to the activated state, the light-emitting ring changes to the color green. A take over request results in the light-emitting ring blinking in a red color.

It is an object of the invention to provide a driving system having a user interface for signaling a take over request that conveys the correct action for taking over of the driving task to the driver intuitively and ensures that he is able to take over.

The object is achieved by the features of the independent patent claims. Advantageous embodiments are described in the dependent claims. It is pointed out that additional features of a patent claim dependent on an independent patent claim can form a separate invention independent of the combination of all of the features of the independent patent claim without the features of the independent patent claim or only in combination with a subset of the features of the independent patent claim, said separate invention being able to be turned into the subject matter of an independent claim, a divisional application or a subsequent application. This applies in the same way to technical teachings described in the description, which are able to form an invention independent of the features of the independent patent claims.

A first aspect of the invention relates to a driving system for automated driving with at least automated transverse guidance. Preferably, both the longitudinal guidance and the transverse guidance are performed by the driving system.

The driving system comprises an indicator for marking regions on the steering wheel, in particular on the steering wheel rim. The indicator for marking are preferably a visual steering wheel display, for example indicated in the steering wheel rim. Preferably, the regions are marked by light-emitting elements that are preferably arranged in the steering wheel rim. However, it is also possible for the impact absorber or the steering wheel spokes to incorporate light-emitting elements that light the regions to be marked on the steering wheel rim.

It is advantageous if a steering wheel display having a light emitting band structure is used that is integrated in the steering wheel rim. The light-emitting band structure is preferably an arcuate structure, in particular a ring. The ring is advantageously completely closed in one exemplary embodiment; however, it would also be possible for the light-emitting band structure to correspond to a ring that is open in the upper region and/or in the lower region. In accordance with another exemplary embodiment, the light-emitting band structure can, instead of being a closed ring, comprise a right hand light-emitting band (in particular a right hand light emitting band arc in the case of an annular steering wheel rim) in the right hand half of the steering wheel rim and a left hand light-emitting band (in particular a left hand light emitting band arc in the case of an annular steering wheel rim) in the left hand half of the steering wheel rim, each of which serve to mark a right hand or a left hand marking region on the steering wheel rim. The length of the left hand and right hand marking regions to be marked preferably corresponds to the length of the left hand and right hand light-emitting band, respectively, but could also be shorter.

The light-emitting band structure preferably comprises multiple light-emitting elements arranged next to one another whose light-emitting behavior is preferably individually controllable. When a left hand a right hand light-emitting band (in particular left hand and right hand light-emitting band arc) is used, each light-emitting band preferably comprises a plurality of light-emitting elements. Preferably, the left hand and the right hand light-emitting band are preferably controllable differently in respect of glowing; in this case, it is furthermore advantageous if each light-emitting element in the respective left hand and right hand light-emitting band is individually controllable.

The driving system is configured to establish during automated driving that the vehicle has approached an end of (currently performed) automated driving lying ahead such that a first proximity condition is satisfied. By way of example, the proximity condition corresponds to the condition that the length related interval or interval of time from the current vehicle position to an end of automated driving is less than or less than or equal to a specific threshold value, for example a threshold value in the range from 5 s to 2 min (e.g. 20 s) in the case of an interval of time or for example a threshold value in the range from 150 m to 4 km (e.g. 700 m) in the case of a length-related interval.

The proximity condition may be related to an end of the road after which the road is no longer approved for automated driving. The proximity condition may alternatively for example also be related to a point situated before that by which the driving task actually needs to have transferred to the driver.

Information about the end may be stored in an electronic map in the vehicle or can be received by the mobile radio network, for example.

If routing by the navigation system is active in the vehicle and the vehicle is traveling on a route calculated by the navigation system, the vehicle can inform the driver not only about an end of automated driving that, as the journey continues, is on the road (e.g. freeway) currently being used but also about ends of automated driving that arise in the event of a change of currently used road on the route.

When the system has established that the vehicle has approached the end of automated driving such that the proximity condition is satisfied, the indicator for marking regions on the steering wheel are controlled in reaction thereto such that a left hand and a right hand marking region are marked on the steering wheel. This prompts the driver to take over the driving task by positioning his hands on the marked regions of the steering wheel.

The inventive concept of marking regions on the steering wheel in order to take over the driving task when the end of automated driving is approached allows the correct action for taking over of the driving task to be conveyed to the driver intuitively and his ability to take over be ensured.

It is pointed out that automated driving can merely also relate just to a driving function with automated transverse guidance without automated longitudinal guidance. In this case, only the transverse guidance needs to be taken over by the driver when automated driving ends. Additionally, there may be provision for not all of the vehicle guidance but rather only the transverse guidance to need to be taken over when automated driving with longitudinal and transverse guidance ends, since the driving system performs the longitudinal guidance after the driving function for automated driving ends.

As explained above, a steering wheel display having a light-emitting band structure incorporated in the steering wheel rim is preferably used, wherein the two regions in the steering wheel rim are marked by virtue of the light-emitting band structure on the left hand and right hand marking regions of the steering wheel rim glowing. If the vehicle is in the automated driving mode beforehand, the light-emitting band structure preferably glows as a ring or instead at least in regions that comprise the left hand and right hand marking regions and go beyond them. In this case, the emitted light color may also be different than the emitted-light color used when the two regions of the steering wheel are marked.

It is advantageous if the driving system is configured to also established whether the driver reacts to the marking of the steering wheel regions by touching the steering wheel, i.e. taking his hands to the steering wheel. This can be accomplished by using for example a hands on sensor system incorporated in the steering wheel, for example a capacitive hands on sensor system. If it has been established that the driver takes his hands to the steering wheel in reaction to the marking of the steering wheel regions, preferably the marking of the two regions is stopped (or alternatively altered, e.g. in color) in reaction thereto in order to signal handover of the driving task to the driver. Automated driving is ended and the driving task is handed over. This reaction may optionally be dependent not only on the condition of putting the hands on the steering wheel but also on one or more additional conditions, for example the driver looking at the traffic ahead (this can be detected by means of camera based driver monitoring).

It is advantageous if the driving system can establish and decide whether the driver touches the steering wheel at a specific left hand region of the steering wheel, in particular at a region in the left hand half of the steering wheel rim, and/or specific right hand region of the steering wheel, in particular at a region in the right hand half of the steering wheel rim, for example at the left hand and/or right hand marking region. By way of example, it may be sufficient in a first configuration thereof if the driver touches the steering wheel at a left hand or right hand region of the steering wheel, in particular at the left hand or right hand marking region, with only one hand. However, it is advantageous if the driving system can check whether the driver touches the steering wheel at a left hand and a right hand region, in particular at the left hand and at the right hand marking region, i.e. positions one hand on the steering wheel on the left, in particular at the left hand marking region, and the other hand on the steering wheel on the right, in particular at the right hand marking region.

If it has been established that the driver, in the first configuration, touches at least one of the regions on the steering wheel on the left and right, in particular a marked region, or alternatively, in the second configuration, touches both regions on the steering wheel on the left and right, in particular both marked regions, then the marking of the two marked regions is preferably stopped (or alternatively altered, e.g. the emitted light color is altered) in order to signal handover of the driving task to the driver, and to hand over the driving task. This reaction can optionally be dependent not only on the condition of putting the hands on the steering wheel but also on one or more additional conditions, for example the driver looking at the traffic ahead.

In the event of a take over requiring both hands to be put on the steering wheel, it is advantageous if, when one hand is put on the steering wheel, the marking of the marked region associated with this hand is stopped or alternatively altered, so that it is made clear to the driver that he also needs to put his second hand on the steering wheel. To this end, the driving system can use a suitable hands on sensor system to establish whether the driver touches the steering wheel with his left hand (for example by detecting that the driver touches a particular region in the left hand half of the steering wheel rim). If this is established, the marking of the left hand marking region is stopped in reaction thereto. Alternatively, the marking of the left hand marking region could also be altered, for example the marking color could change from red to green.

In a corresponding manner, the hands on sensor system can also be used to establish whether the driver touches the steering wheel with his right hand, the marking of the right hand marking region being stopped or altered in reaction thereto.

When the steering wheel is touched only with one hand, the marking of the marking region associated with the hand is thus deactivated (or alternatively the marking is altered), for example. The other marking region continues to remain marked as previously while the driver does not touch the steering wheel with both hands. This signals to the driver that he also needs to touch the steering wheel with his second hand in order to acknowledge the take over request. Only touching the steering wheel with both hands is rated as taking over of the driving task.

If the driver initially touches the steering wheel just with one hand, and it is then established that he has removed the hand, the circumstance that the marking of the marking region associated with the hand was stopped or was altered (beforehand) is revoked in reaction thereto, i.e. the removal of the hand leads back to the state in which both marking regions glow as beforehand.

To check that the steering wheel is being touched by both hands, in particular both marking regions, for example two nonelectrically connected separate sensor mats are incorporated in the steering wheel in the left hand and right hand steering wheel rim halves, for example in the left hand marking region and the right hand marking region or preferably also beyond those, in the case of capacitive partial sensors, with a signal that is characteristic of the capacitance of the first sensor mat and a signal that is characteristic of the capacitance of the second sensor mat being evaluated in an evaluation unit in order to establish whether the driver touches the steering wheel with both hands, for example touches both marking regions.

It is also possible for a more sophisticated hands on sensor system to be used that covers the entire steering wheel rim or at least the majority of the steering wheel rim, and by means of which the more precise orientation of the respective hand on the steering wheel rim can be determined.

Alternatively, a first sensor, e.g. a capacitive sensor, incorporated in the steering wheel and a camera can be used. By way of example, this is a camera arranged in the driver's cockpit behind the steering wheel from the point of view of the driver (for example arranged in the region of the instrument combination) and directed at the driver. On the basis of a signal from the first sensor, it is established whether at least one hand is on the steering wheel. This can be effected in the conventional manner. On the basis of a video signal from the camera, it is decided whether—in the event of at least one hand being detected to be on the steering wheel by means of the first sensor—the hands are on the steering wheel on the left and right, in particular at the left hand and right hand marking regions.

It is pointed out that the regions at which the steering wheel is touched that are taken over by the hands on sensor system are preferably larger, in particular somewhat larger, than the marked regions; in this case, the driving task is handed over to the driver even when the steering wheel is touched beside the marked regions, in particular directly beside the marked regions.

It is advantageous if, before the two marking regions are marked on the steering wheel, the light emitting band structure is used to signal the distance to the end of automated driving in the form that, when the distance to the end of automated driving is progressively decreasing, the left hand and the right hand portion of the light-emitting band structure each glow similarly to a countdown as the length progressively decreases. In this case, the illumination decreases starting from the upper and/or lower region of the light-emitting band structure. The length of the illuminated regions is progressively reduced to a defined minimum length, with the lit regions of minimum length of the left hand and the right hand portion then corresponding to the left hand and the right hand marking region. In this case, the marking regions can be marked by virtue of the emitted light color being changed to a color having a greater warning nature (e.g. from blue to yellow or red) and/or being switched from a steady glow to a glow with alternating emitted light intensity (e.g. blinking, flashing, pulsating).

The countdown in the form of the decrease in the length of the illuminated regions starts when the vehicle has approached the end of automated driving lying ahead such that a second proximity condition is satisfied. The second proximity condition is already satisfied earlier, when the end of automated driving is approached, than the first proximity condition, satisfaction of which triggers the marking of the two steering wheel regions.

In a preferred exemplary embodiment of the invention, the regions where the hands of the driver are meant to be positioned in order to ensure that he is able to take over are marked on the steering wheel by light-emitting elements. When the hands are positioned there correctly, the request (i.e. the light signal) is also stopped, as a result of which it can be signaled that a take over has occurred.

A second aspect of the invention relates to a method for marking regions on the steering wheel within the framework of a request to take over the driving task from a driving system for automated driving with at least automated transverse guidance. The method has the following steps:

establishing during automated driving that the vehicle has approached an end of automated driving lying ahead such that a specific proximity condition is satisfied; and reacting thereto by controlling an indicator for marking regions on the steering wheel such that a left hand and a right hand marking region are marked on the steering wheel, so that the driver positions his hands on the marked regions on the steering wheel to take over the driving task.

The above explanations pertaining to the inventive driving system according to the first aspect of the invention also apply in corresponding fashion to the inventive method according to the second aspect of the invention. Advantageous exemplary embodiments of the inventive method that are not described explicitly at this juncture and in the patent claims correspond to the advantageous exemplary embodiments of the inventive driving system that are described above or in the patent claims.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6A-6C show a second exemplary embodiment of a steering wheel with a steering wheel display.

DETAILED DESCRIPTION OF THE DRAWINGS

Figure 1:
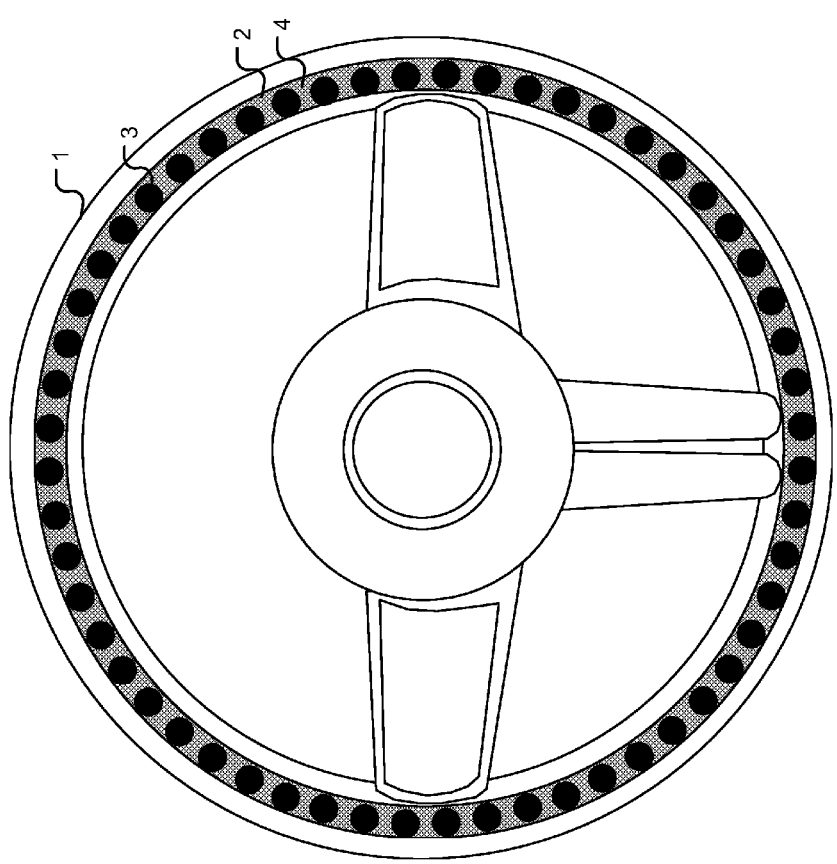
FIG. 1 shows an exemplary embodiment of a steering wheel with a steering wheel display.

FIG. 1 depicts an exemplary embodiment of a steering wheel 1 with a steering wheel display. The steering wheel display has a light emitting band structure 2 in the form of a preferably closed ring, said light emitting band structure being incorporated in the steering wheel rim. The light emitting band structure 2 comprises a chain of light-emitting elements 3 of the same type that are arranged next to one another. The light-emitting elements 3 are for example light-emitting diodes (LED).

Each light emitting element 3 can comprise one or more light-emitting diodes, for example two or three diodes, in particular in the case of a light-emitting element 3 capable of emitting light in different emitted light colors.

The light-emitting elements 3 are preferably arranged behind a translucent layer 4 that is inset in the steering wheel rim and through which light is emitted.

The light-emitting elements 3 can preferably be actuated individually. It is advantageous if the light-emitting elements 3 can glow in different colors, for example in blue, yellow and red.

Depending on the interval, number of light-emitting elements 3 and scatter of the light, the light emitting nature of the light emitting band structure 2 can range from a substantially homogeneous illumination in the region of the glowing light-emitting elements 3 to a rather loose chain of light-emitting spots.

The steering wheel display is part of a user interface of an exemplary driving system for automated driving. The driving system has a driving mode for highly automated driving with automated longitudinal and transverse guidance, for example for driving on the freeway. Furthermore, further driving modes with a lower level of automation are possible, for example a driving mode for semiautomated driving with automated longitudinal and transverse guidance and a driving mode for assisted driving with automated longitudinal guidance and/or another driving mode for assisted driving with automated transverse guidance. The example described below on the basis of the driving mode for highly automated driving can also be transferred to one of the other levels of automation with at least automated transverse guidance.

Figure 2:
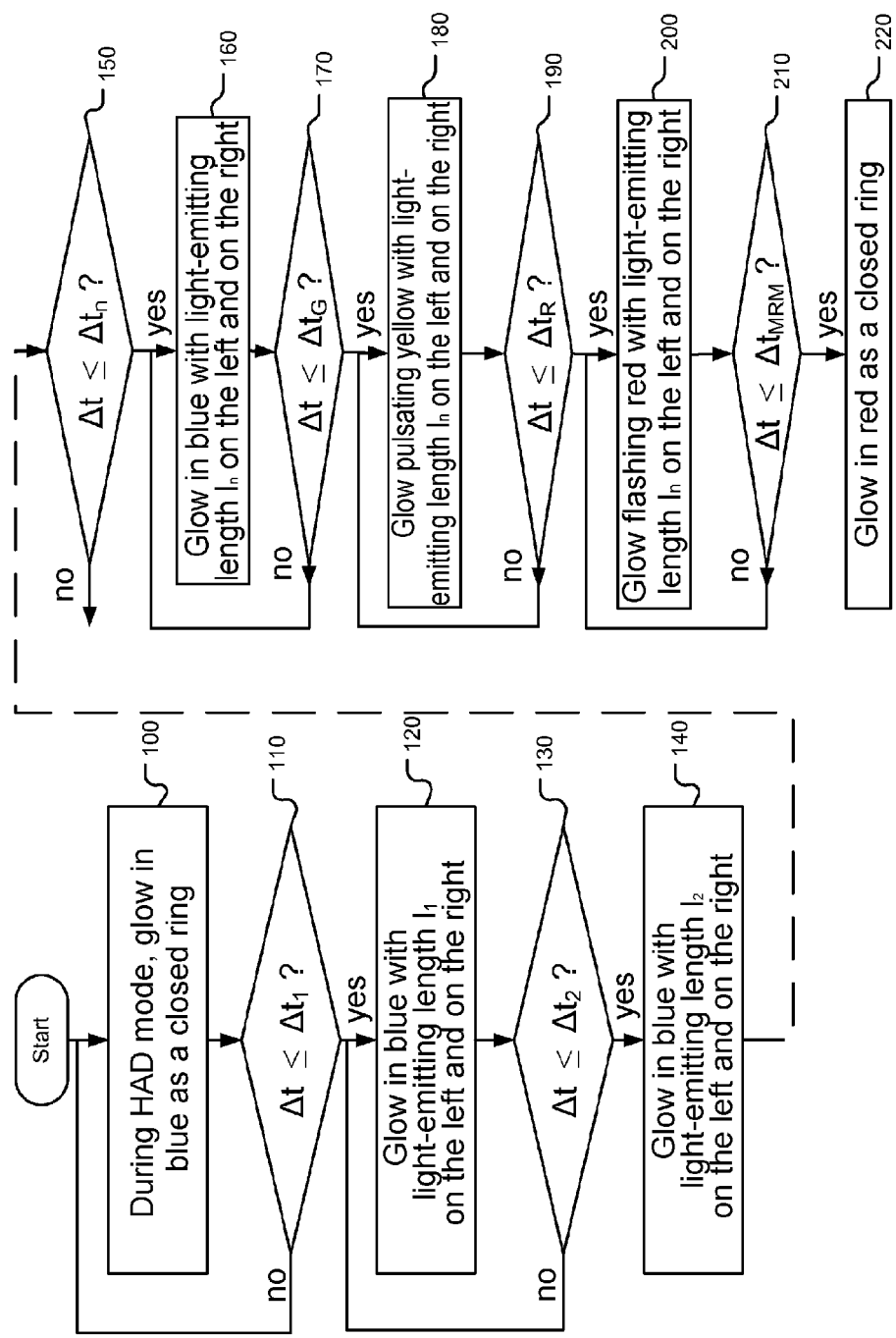
FIG. 2 is an exemplary flowchart for the control of the steering wheel display.
Figure 3:
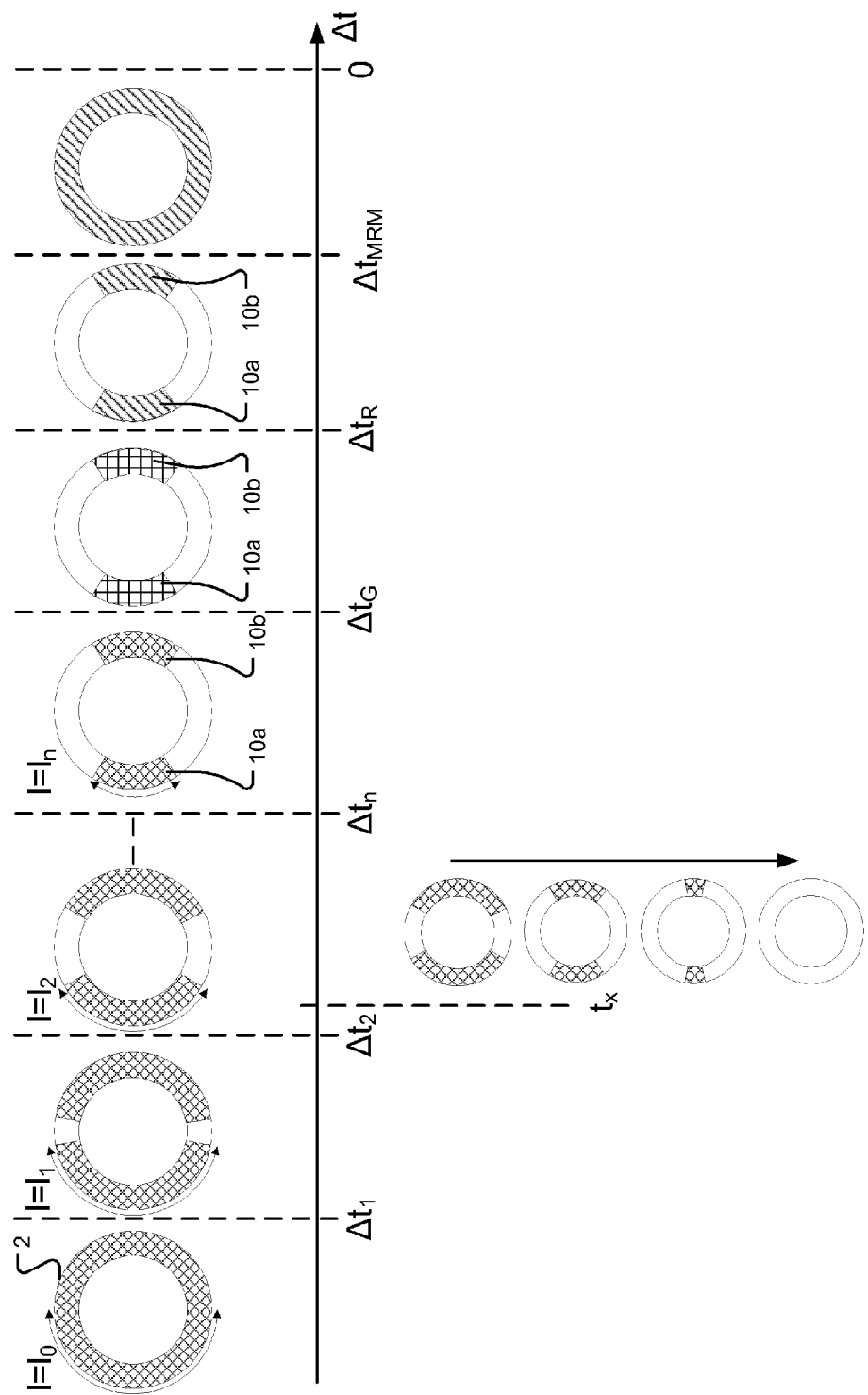
FIG. 3 illustrates an exemplary sequence of display states of the steering wheel display over the interval of time Δt at the end of the automation road.

An exemplary sequence for the steering wheel display when the remaining distance to an end of highly automated driving is decreasing is depicted below in conjunction with FIG. 2 and FIG. 3.

The sequence starts from a state in which the driving mode for highly automated driving is active and the longitudinal and transverse guidance of the vehicle is performed by the driving system. In this state, appropriate actuation of the steering wheel display means that the light-emitting band structure 2 glows as a closed ring in a first color assigned to highly automated driving (see step 100); all of the light-emitting elements 3 glow in the first emitted light color, e.g. blue, for this purpose. The length of the right hand and left hand light-emitting regions of the ring is 10 in each case. This is preferably a steady glow.

Based on the road distance Δs to a known end of highly automated driving and a forecast of the speed to the end, the current distance in time Δt to the end of highly automated driving is estimated continually.

For the purpose of controlling the steering wheel display, fixed distances in time $\Delta t1, \Delta t2, \ldots, \Delta tn\,1, \Delta tn, \Delta tG, \Delta tR, \Delta tMRM$ to the end of highly automated driving, where n>2, are predefined, wherein the following relationship holds:

$$\Delta t1 > \Delta t2 > \Delta t2+1 \ldots > \Delta tn1 > \Delta tn > \Delta tG > \Delta tR > \Delta tMRM$$

The variable n indicates the number of steps by which the length of the regions glowing in the first emitted light color is decreased, for example 5 steps.

For each reduction step, a defined number of the topmost and bottommost light emitting elements 3 that are still glowing in the first emitted light color before the respective length reduction are switched off. Alternatively, it would also be possible for these light-emitting elements 3 to switch to a different emitted light color. The length reduction takes place for the left hand and right hand sides of the light emitting display in the same way. The decrease from the top and the bottom can take place substantially symmetrically; this is not imperative, however.

After the current distance in time Δt has become less than or equal to the prescribed distance in time Δt1 (see query 110 in FIG. 2), the light emitting length l by which the left hand or right hand portion of the steering wheel display glows in blue is reduced to the length l=l1 (see FIG. 3 and step 120 in FIG. 2) by virtue of a defined set of the topmost and bottommost light emitting elements 3 that glow in the first emitted light color being switched off. As the length reduces, it would also be possible to switch from the steady glow to a blinking glow.

After the current distance in time Δt has become less than or equal to the prescribed distance in time Δt2 (see query 130 in FIG. 3), the light emitting length l by which the left hand or right hand portion of the steering wheel display glows in the first emitted light color is reduced to the length l=l2 (see FIG. 3 and step 140) by virtue of a further defined set of the topmost and bottommost light-emitting elements 3 that glow in the first emitted light color being switched off.

If the driver does not take over the driving task, the length is progressively reduced as the individual distances in time ti are reached until the length l by which the left hand or right hand portion of the steering wheel display glows in the first emitted light color is reduced to the minimum length l=ln>0 (see step 160) after the distance in time Δtn has been reached at the end of automated driving (see the query 150). Alternatively, it would also be conceivable for the length to be progressively reduced to zero as the individual distances in time ti are reached.

The region of minimum length ln of the left hand and right hand halves that glows in the emitted light color marks the left hand touch region 10a and right hand touch region 10b, respectively, for touching the steering wheel 1.

If the driver does not take over the driving task, the emitted-light color is switched from the first emitted light color to a second emitted light color (see step 180), which has a greater warning nature (e.g. to the color yellow) in comparison with the first emitted light color, after the distance in time ΔtG is reached (see query 170). In this case, the minimum length ln is retained. If, in the alternative configuration, the length l has already been reduced to zero beforehand, the length is increased accordingly. Preferably, this is a pulsating glow.

If the driver does not take over the driving task, the emitted light color is switched from the second emitted light color to a third emitted light color (see step 200), which has a greater warning nature (e.g. to the color red) in comparison with the second emitted-light color, after the distance in time ΔtR is reached (see query 190). In this case, the length ln is retained. Preferably, this is a flashing glow.

If the driver does not take over the driving task, the steering wheel display is actuated after the distance in time ΔtMRM is reached (see query 2100) such that the light-emitting ring glows as a closed ring in the second emitted-light color (see step 220). This is preferably a steady glow. Preferably, there is provision for the vehicle to then perform an emergency stop maneuver.

It has been assumed above that initially the distance in time Δt is greater than Δt1. If, however, not until after the distance in time Δt1 is reached it is established that there is an end of automation ahead, the light emitting state associated with the distance in time Δt is adopted and, thereafter, when the distance in time decreases further, the light emitting state is altered in accordance with the description above. If the remaining period of time for the light emitting state is below a specific measure in this case, it is possible to wait directly for the light-emitting state that follows in the sequence or to change directly to this light-emitting state correspondingly earlier.

If, starting from the initial length l0, a light emitting state with glow in the first color and a reduced light emitting length li is intended to be adopted, the light emitting length can be reduced from the initial length l0 to the target length li in steps in quick succession.

At least after the distance in time Δt1 is reached, the driver can take over the driving task by virtue of the driver taking his hands to the steering wheel 1. A hands on sensor system in the steering wheel is used to detect when the driver takes his hands to the steering wheel 1. In reaction thereto, the remaining regions of the steering wheel display that glow in the first emitted-light color are reduced to zero in quick succession and the driving task is handed over to the driver. This reaction can be dependent on whether one or more optional further conditions are satisfied, for example whether the driver looks at the traffic situation ahead. The rapid decrease to zero signals to the driver handover of the driving task to the driver. In FIG. 3, the lower region of the diagram depicts an exemplary behavior of the steering wheel display when the driver takes his hands to the steering wheel at the time tx in order to take over the driving task.

If the light-emitting states in accordance with steps 160, 180 and 200, in which the left hand and right hand touch regions 10a, 10b are marked, have already been reached, detection of the hands being put on the steering wheel (and possibly of one or more optional further conditions being satisfied) results in the respective light-emitting signal being ended and the driving task being handed over to the driver.

Figure 4:
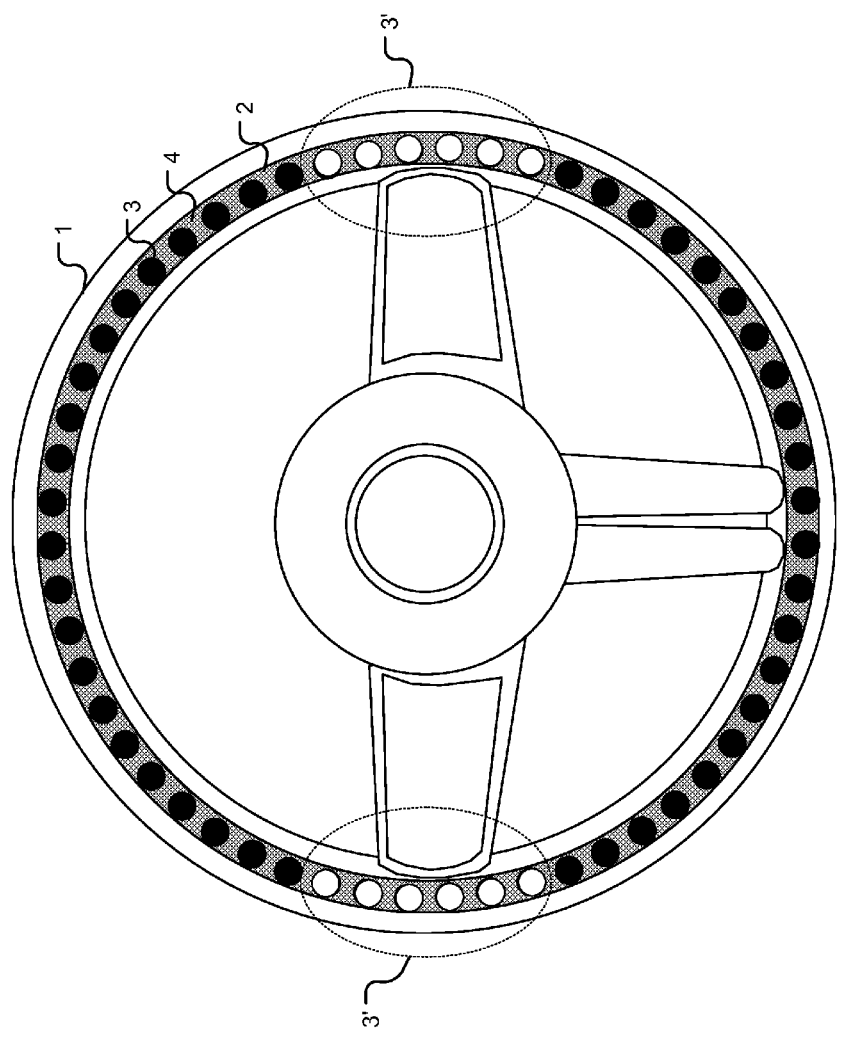
FIG. 4 shows an exemplary light emitting state in which the left hand region and the right hand region of the steering wheel rim are marked by the glowing light-emitting elements.

FIG. 4 depicts an exemplary light-emitting state of the light-emitting elements 3 in which the left hand region 10a and the right hand region 10b of the steering wheel rim are marked by the glowing light emitting elements (see steps 160, 180, 200). In FIG. 4, the currently glowing light-emitting elements 3 are marked by the reference sign 3' and depicted in white. In step 160 the emitted-light color is blue, in step 180 the emitted-light color is yellow and in step 200 the emitted-light color is red.

If the countdown described above is dispensed with and from FIG. 2 there is merely provision for the light-emitting states in accordance with steps 180 and 200, it would also be possible to use an appropriately configured hands on sensor system to check whether the driver actually positions his hands at the marked regions 10a, 10b, and for handover to take place on the basis thereof.

Figure 5:
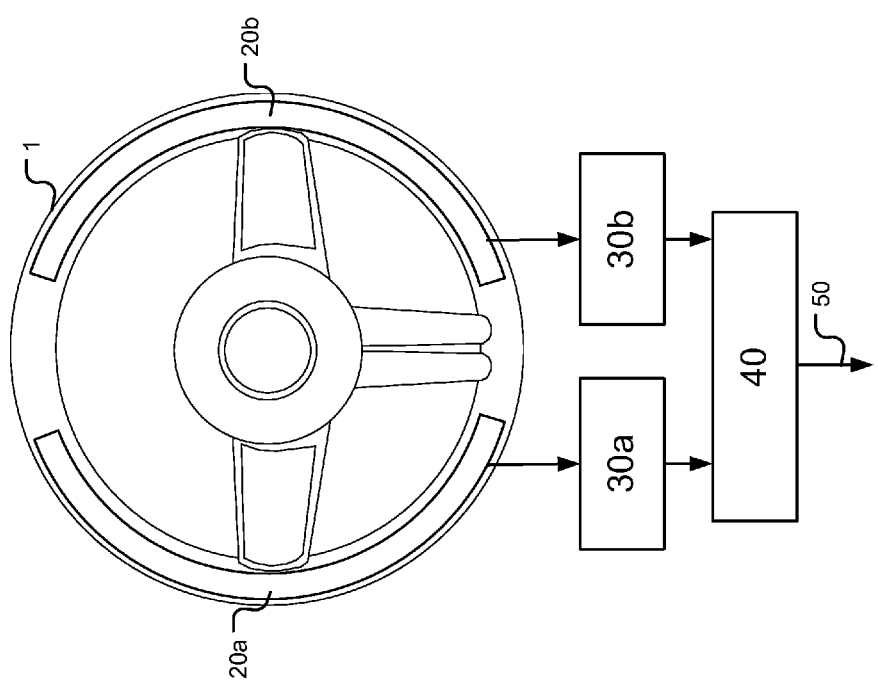
FIG. 5 shows an exemplary embodiment of a hands-on sensor system.

FIG. 5 schematically depicts an exemplary embodiment of a hands on detection apparatus suitable for this purpose for a steering wheel 1. In this case, at least the sensor system is incorporated in the steering wheel 1, in particular in the steering wheel rim; the evaluation can take place inside or outside the steering wheel 1.

The hands on detection device comprises a first partial sensor 20a, which is incorporated in the left hand half of the steering wheel rim, and a second partial sensor 20b, which is incorporated in the right hand half of the steering wheel rim. The partial sensors 20a and 20b are for example two capacitive sensor mats. The sensor regions covered by the partial sensors 20a and 20b comprise at least the marking regions 10a and 10b and preferably also go beyond those at the top and bottom. Alternatively, the sensor regions substantially correspond to the marking regions 10a and 10b.

The first partial sensor 20a is electrically connected to a first partial evaluation unit 30a, which is configured to establish whether the driver touches the steering wheel with his left hand in the sensor region of the partial sensor 20a, for example by measuring a variable, characteristic of the capacitance, that is subject to a change when the steering wheel region monitored by the respective partial sensor is touched. The second partial sensor 20b is electrically connected to a second partial evaluation unit 30b, which is configured to establish whether the driver touches the steering wheel 1 with his right hand in the sensor region of the partial sensor 20*b*, for example by measuring a variable that is characteristic of the capacitance.

The preferably digital evaluation signals from the two partial evaluation units 30*a*, 30*b*, which each indicate whether a touch by the left or right hand in the respective sensor regions has been detected by means of the respective partial sensor 20*a*, 20*b*, can be used in the evaluation unit 40 to ascertain whether:

there is just a single hand on the steering wheel 1 at the sensor regions, both hands are on the steering wheel 1 at the two sensor regions, or no hands are on the steering wheel 1 at the sensor regions.

Figure 6A:
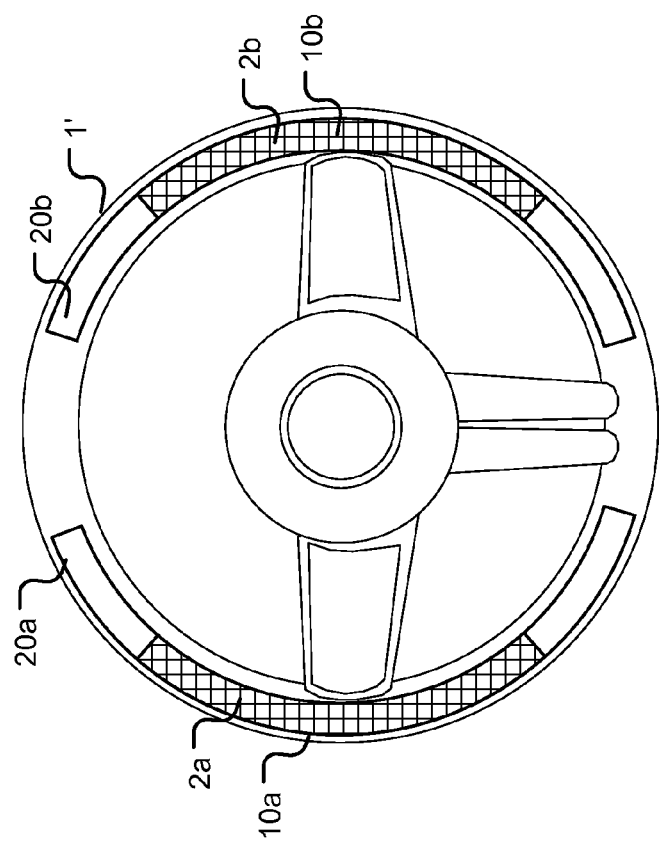

FIG. 6A depicts a further exemplary embodiment of a steering wheel 1' with a steering wheel display. The steering wheel 1' comprises a hands on detection apparatus that can distinguish between whether the steering wheel is touched just with the left hand, whether the steering wheel is touched just with the right hand, or whether the steering wheel is touched with both hands. It is subsequently assumed that the steering wheel 1 comprises the hands on detection apparatus depicted in FIG. 5 with the partial sensors 20*a* and 20*b*. The light emitting band structure is not realized as a closed ring in this example, but rather comprises two light emitting band arcs, a left hand light emitting band arc 2*a* and a right hand light emitting band arc 2*b*, which preferably again comprise individual light-emitting elements, as has been described above. It would alternatively be possible for there to be provision for a closed ring as the light-emitting band, in which case the upper and lower regions are not used for the take over request.

FIG. 6A depicts the state in which the take over request is active and the left hand and right hand marking regions 10*a* and 10*b* are marked by virtue of the left hand and right hand light emitting band arcs 2*a* and 2*b* glowing, for example in a specific emitted light color (e.g. red), and/or blinking as appropriate.

FIG. 6B depicts the state when the driver, starting from the state in FIG. 6A, touches the steering wheel 1' with just one hand. Acknowledging the take over request with just one hand (in this case: the left hand) deactivates the marking of the marking region associated with this hand (in this case the marking region 10*a*). When two light emitting band arcs 2*a* and 2*b* are used, the light-emitting band arc associated with this hand is deactivated, for example. Alternatively, it would also be possible for the color to be changed, e.g. from red to yellow or from red to green. The marking of the respective other marking region (in this case: the region 10*b*) continues to be active and thereby signals that the driver also needs to touch the steering wheel with his second hand. If the driver removes his hand from the steering wheel (in this case the left hand), this again leads back to the state in FIG. 6A by virtue of both marking regions 10*a* and 10*b* being marked as beforehand.

Figure 6C:
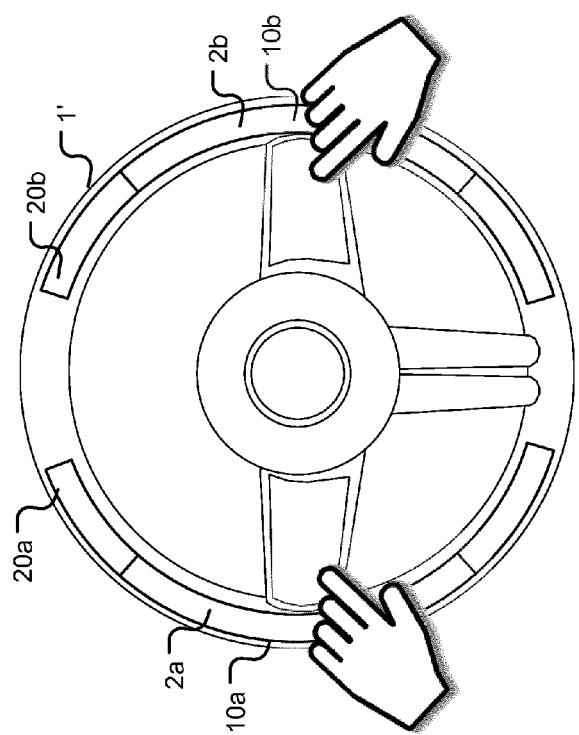

FIG. 6C depicts the state when the driver responds to the take over request by touching the steering wheel 1' with both hands (for example starting from the state in FIG. 6B). Both marking regions 10*a* and 10*b* are now deactivated or have changed their emitted-light color in comparison with the state in FIG. 6A. The acknowledgement is not complete until it is detected that both hands are on the steering wheel at the same time. As a result, unintentional acknowledgement of the take over request is highly unlikely.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving system for automated driving with at least automated transverse guidance for a motor vehicle, the driving system comprising:
   an indicator for marking regions on the steering wheel,
   a controller that is configured to:
      establish during automated driving that the vehicle has approached an end of automated driving lying ahead such that a first proximity condition is satisfied, and
      react thereto by controlling the indicator for marking regions on the steering wheel such that a left hand marking region and a right hand marking region are marked on the steering wheel, so that a driver positions his hands on the marked regions on the steering wheel for taking over a driving task, wherein taking over of the driving task requires the steering wheel to be touched simultaneously with both hands, and
   a sensor that is configured to:
      establish that the driver touches a left hand touching portion of the steering wheel with his left hand, wherein the controller is configured to react thereto by stopping or altering the marking of only the left hand marking region, and
      establish that the driver touches a right hand touching portion of the steering wheel with his right hand, wherein the controller is configured to react thereto by stopping or altering the marking of only the right hand marking region.

2. The driving system according to claim 1, wherein the indicator for marking regions on the steering wheel is configured to mark the left hand marking region and the right hand marking region on a rim of the steering wheel.

3. The driving system according to claim 2, wherein the indicator for marking regions comprises a visual steering wheel display.

4. The driving system according to claim 3, wherein the steering wheel display has a light-emitting band structure that is integrated in the steering wheel rim, and is annular or comprises a left hand light emitting band and a right hand light emitting band.

5. The driving system according to claim 4, wherein the controller is further configured to:
   react to the vehicle having approached an end of automated driving lying ahead such that the first proximity condition is satisfied by controlling the steering wheel display such that the light emitting band structure at the left hand and right hand marking regions of the steering wheel rim glows to mark these regions, and
   control the steering wheel display such that beforehand during automated driving the light emitting band structure glows as a ring or at least glows in regions that comprise the left hand and the right hand marking region and go beyond them.

6. The driving system according to claim 1, wherein the controller is further configured to:
   establish that the driver, after touching the steering wheel with his left or right hand, has finished touching the steering wheel with his hand, and
   react thereto by revoking the circumstance that the marking of the marking region associated with the hand has been stopped or has been altered.

7. The driving system according to claim 4, wherein
the light emitting band structure is capable of emitting light in an emitted light color of length alterable depending on actuation and comprises a left hand portion and a right hand portion, and
wherein the controller is further configured to:
control the steering wheel display such that during automated driving the light emitting band structure glows over an initial length,
establish that the vehicle has approached an end of automated driving lying ahead such that a second proximity condition is satisfied, and
react thereto by controlling the steering wheel display such that a progressively decreasing distance from the end of automated driving results in the left hand and the right hand portion of the light emitting band structure each glowing with progressively decreasing length, wherein
illumination decreases starting from an upper and/or lower region of the light emitting band structure,
the length is reduced to a defined minimum length, and
the light emitting region of minimum length of the left hand portion and the right hand portion corresponds in each case to the left hand marking region and the right hand marking region.

8. A method for marking regions on the steering wheel within a framework of a request for a driver to take over a driving task from a driving system for automated driving with at least automated transverse guidance, the method comprising the steps of:

establishing during automated driving that the vehicle has approached an end of automated driving lying ahead such that a specific proximity condition is satisfied,
reacting thereto by controlling an indicator for marking regions on the steering wheel such that a left hand marking region and a right hand marking region are marked on the steering wheel, so that the driver positions his hands on the marked regions on the steering wheel for taking over the driving task, wherein taking over of the driving task requires the steering wheel to be touched simultaneously with both hands,
establishing that the driver touches a left hand touching portion of the steering wheel with his left hand, and reacting thereto by stopping or altering the marking of only the left hand marking region, and
establishing that the driver touches a right hand touching portion of the steering wheel with his right hand, and reacting thereto by stopping or altering the marking of only the right hand marking region.

9. The driving system according to claim 1, wherein
taking over of the driving task further requires detection of an additional condition.

10. The driving system according to claim 9, wherein
the additional condition comprises the driver looking at traffic ahead of the vehicle.

11. The method according to claim 8, wherein
taking over of the driving task further requires detection of an additional condition.

12. The method according to claim 11, wherein
the additional condition comprises the driver looking at traffic ahead of the vehicle.

* * * * *